United States Patent
Wilkinson

[15] 3,680,248
[45] Aug. 1, 1972

[54] FISHHOOK EXTRACTOR

[72] Inventor: Olie Wilkinson, 79 Phlox Dr., Whitmore Lake, Mich. 48189

[22] Filed: March 15, 1971

[21] Appl. No.: 124,316

[52] U.S. Cl. ................................................43/53.5
[51] Int. Cl. ..............................................A01k 97/00
[58] Field of Search........................................43/53.5

[56] References Cited

UNITED STATES PATENTS

| | | | |
|---|---|---|---|
| 1,611,544 | 12/1926 | Maurus | 43/53.5 |
| 2,164,907 | 7/1939 | Falkner | 43/53.5 |
| 2,492,799 | 12/1949 | Holland | 43/53.5 |
| 2,519,098 | 8/1950 | Aye | 43/53.5 |
| 2,586,431 | 2/1952 | Krichbaum | 43/53.5 |
| 2,603,027 | 7/1952 | Barber | 43/53.5 |
| 2,777,244 | 1/1957 | McKinley | 43/53.5 |

FOREIGN PATENTS OR APPLICATIONS

| | | | |
|---|---|---|---|
| 760,116 | 12/1933 | France | 43/53.5 |
| 586,925 | 10/1933 | Germany | 43/53.5 |

*Primary Examiner*—Joseph S. Reich
*Attorney*—Olsen & Stephenson

[57] ABSTRACT

Apparatus is disclosed for the extraction or removal of a hook from a fish. The fishhook extractor has a flat spoon-like handle at one end and a hollow cylindrical traction portion having a spiral slot through a wall portion thereof for passing a fishing line therethrough at the other end in which the fish line is retained during the extraction operation. A generally rectangular arcuate sectioned tab having relatively sharp lateral edges extend beyond the other end from a segment portion of the cylinder that is not slotted. The fishhook is positioned in engagement with an edge of the extraction portion and the hook is released by relative turning of the extractor with respect to the fish and removed by withdrawal therefrom.

6 Claims, 4 Drawing Figures

PATENTED AUG 1 1972 3,680,248

INVENTOR
OLIE E. WILKINSON
BY
OLSEN & STEPHENSON
ATTORNEYS

FISHHOOK EXTRACTOR

BACKGROUND OF THE INVENTION.

This invention relates to an improved fishhook removal or extraction implement. Fishhook extractors for the removal of fishhooks from the mouths of fish are known. Examples of prior art teachings of fishhook extractors can be found in U.S. Pat. No. 2,164,907, issued July 4, 1939 to Faulkner; U.S. Pat. No. 2,586,431, issued Feb. 19, 1952 to Kirchbaum and U.S. Pat. No. 2,777,244, issued Jan. 15, 1957 to McInley. When using extractors of the type disclosed in the prior art, it is normally necessary to hold the fish with one hand while using the other hand to hold the extractor and also to retain the fish line taut. In some instances the fisherman may desire or find it necessary to avoid handling the fish, and it is difficult to do so with the prior art devices and still remove the embedded hook. The prior art devices also create handling problems with respect to retaining the fish line in the desired taut position with respect to the fishhook extractor.

SUMMARY OF THE INVENTION

The present invention has overcome the shortcomings of the above prior art and has provided a fishhook remover which is constructed and arranged so that the fish line can be held in a desired taut position in the extractor, and the fish can be disengaged from the fishhook merely by the manipulation of the extractor without handling of the fish.

According to one form of the present invention a fishhook extractor is provided which has a handle at one end and an extraction portion or cylindrical formation at the other end, said cylindrical formation terminating in a generally rectangular tab that is a longitudinal extension of one segment of the cylindrical formation. The cylindrical formation has another segment through which a slot extends lengthwise for the passage of a fish line to which a fishhook is attached. In its preferred form, the cylindrical formation defines a spiral slot which, because of its non-linear shape, will prevent escape of the taut fish line from the cylindrical formation during the extraction operation.

The rectangular tab forming the extension of the cylindrical formation also has knife-like lateral edges to facilitate removal of the embedded fishhook merely by imparting a generally rotational movement or spinning action of the fish relative to the extractor. This can be accomplished merely by holding the extractor by its handle with the extractor fully inserted into the fish so that one edge of the tab is in engagement with the hook, and then applying a quick twist to the extractor so as to spin the fish around the extractor.

Thus, it is an object of the present invention to provide an improved fishhook extractor which is constructed and arranged to enable a fisherman to remove a fishhook from a fish in a most effective manner.

Other objects of this invention will appear in the following description and appended claims, reference being had to the accompanying drawing forming a part of this specification wherein like reference characters designate corresponding parts in the several views.

DESCRIPTION OF THE PREFERRED EMBODIMENT

Figure 1:
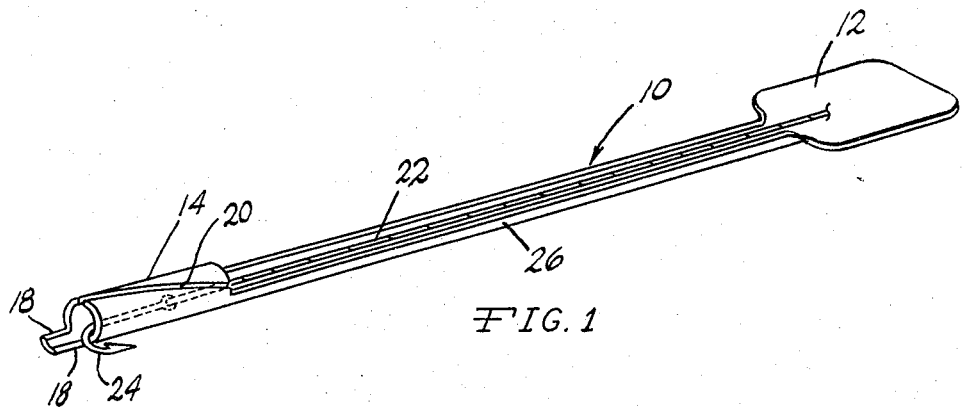
FIG. 1 is a perspective view of a fishhook extractor embodying one form of the present invention showing the normal position of the fishhook extractor with respect to a fishhook and line at the start of the extraction operation.
Figure 2:
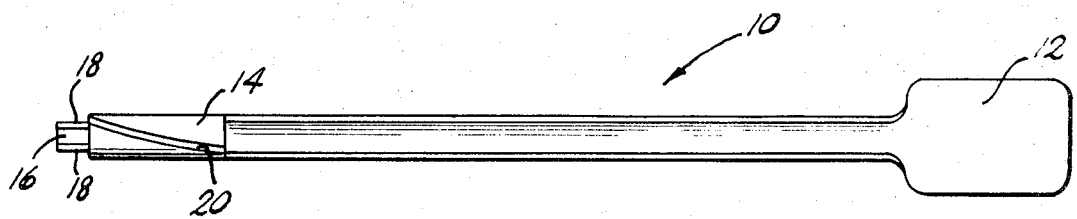
FIG. 2 is a top plan view of the fishhook extractor embodying the present invention.
Figure 3:
FIG. 3 is a side elevational view of the extractor.
Figure 4:
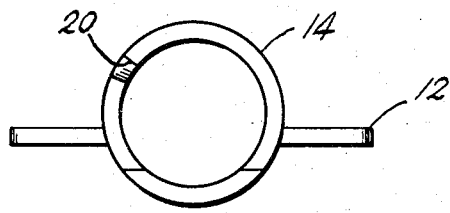
FIG. 4 is an enlarged and elevational view of the extractor.

It is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the fishhook extractor 10 is a sheet metal stamping which has been formed to define at one end a handle 12 which has a flat spoon-like configuration, and which has an extraction portion or cylindrical formation 14 at its other end. The cylindrical formation 14 has a segment which extends longitudinally beyond the remainder of the cylindrical formation to define a generally rectangular tab 16 which has knife-like lateral edges 18. The cylindrical formation 14 has another longitudinal segment opposite from the first-named segment which defines a nonlinear slot 20, which in the preferred embodiment is spiral in shape. The slot 20 is dimensioned so that it can receive a fish line 22 for passage therethrough after which the extractor 10 can be moved along the line until it is in engagement with a fishhook 24 connected to the end of the line 22, as is shown in FIG. 1.

The extractor 10 has a stem portion 26 extending between the handle 12 and the cylindrical portion 14 which is concave in cross section to provide strength and also to receive the fish line 22 therein as shown in FIG. 1. It will be observed that when the fish line 22 is drawn taut as shown in this figure, it can then be retained in the taut position by holding it against the flat spoon-like configuration of the handle 12.

When it is desired to remove a fishhook 24 from a fish in which it is embedded, the removal operation can be performed merely by initially passing the fish line 22 through the slot 20 after which the line will be drawn taut to the position shown in FIG. 1. Thereafter, the fish can readily be removed merely by the fisherman giving a quick twist of his wrist so as to impart relative rotational movement between the extractor 10 and the fish (not shown). To facilitate removal of the hook from the fish, the edge 18 has a knife-like character so that it can aid in cutting away a portion of the fish to facilitate withdrawal of the hook 24 should the latter be deeply embedded in the fish. It will be recognized that the fishhook 24 can be retained adjacent to either edge 18 for turning in either direction that is most convenient for the fisherman.

In the manufacture of the fishhook extractor 10, the extractor preferably will be formed from sheet metal which can be cut in the form of a blank and formed to the finished configuration shown in the drawing. However, it will be understood that other materials having rigid properties will also be used.

It is claimed:

1. A hollow fishhook extractor which has a handle at one end and a cylindrical formation at the other end, said cylindrical formation terminating in a generally rectangular tab that is a longitudinal extension of one segment of the cylindrical formation, said cylindrical formation having a longitudinally extending slot located at another segment thereof for the passage of a fish line to which a fishhook is attached.

2. The fishhook extractor that is defined in claim 1, wherein said rectangular tab has relatively sharp lateral edges.

3. The fishhook extractor that is defined in claim 1, which is made of sheet metal.

4. The fishhook extractor that is defined in claim 1, which is concave in cross-section between said handle and said cylindrical formation.

5. The fishhook extractor that is defined in claim 1, wherein said handle has a flat spoon-like configuration.

6. The fishhook extractor that is defined in claim 1, wherein said slot defines a spiral passageway.

* * * * *